United States Patent [19] [11] Patent Number: 4,603,685
Jean et al. [45] Date of Patent: Aug. 5, 1986

[54] SOLAR HEATING SYSTEM

[75] Inventors: Benoît Jean, Boucherville; Benoît Bergevin; Fernand Rheault, both of Sainte-Julie, all of Canada

[73] Assignee: Institut National de la Recherche Scientifique, Canada

[21] Appl. No.: 506,542

[22] Filed: Jun. 21, 1983

[51] Int. Cl.⁴ .............................. F24J 2/32; F24J 3/02
[52] U.S. Cl. .................................... 126/433; 126/432; 126/435
[58] Field of Search ............... 126/433, 432, 435, 437, 126/417, 428, 419, 421, 423, 434; 165/104.19, 104.21, 104.22, 104.24, 104.25, 104.31

[56] References Cited

U.S. PATENT DOCUMENTS

| | | |
|---|---|---|
| 4,057,963 | 11/1977 | Basiulis ....................... 165/104.24 X |
| 4,065,056 | 12/1977 | Regamey . |
| 4,078,149 | 3/1978 | Whirlow et al. .......... 165/104.24 X |
| 4,134,390 | 1/1979 | Rawal . |
| 4,177,767 | 12/1979 | Regamey . |
| 4,211,207 | 7/1980 | Molivadas . |
| 4,224,925 | 9/1980 | Movick ......................... 126/433 X |
| 4,238,873 | 12/1980 | Frank et al. . |
| 4,242,988 | 1/1981 | Regamey . |
| 4,270,521 | 6/1981 | Breppe .............................. 126/433 |
| 4,277,489 | 10/1981 | Regamey . |
| 4,305,382 | 12/1981 | Nott ..................................... 126/433 |
| 4,340,030 | 7/1982 | Molivadas ...................... 126/433 X |
| 4,467,862 | 8/1984 | DeBeni ............................ 126/433 X |

FOREIGN PATENT DOCUMENTS

| | | |
|---|---|---|
| 1008046 | 4/1977 | Canada . |
| 1036026 | 8/1978 | Canada . |
| 1087053 | 10/1980 | Canada . |
| 1088823 | 11/1980 | Canada . |
| 1103539 | 6/1981 | Canada . |
| 1107164 | 8/1981 | Canada . |
| 1115145 | 12/1981 | Canada . |
| 1116036 | 1/1982 | Canada . |
| 233944 | 12/1975 | France . |
| 2428157 | 6/1978 | France . |
| 51-602 | 5/1976 | Japan . |
| 85014 | 7/1976 | Japan . |
| 84303 | 7/1977 | Japan . |
| 154480 | 12/1979 | Japan . |
| 155301 | 12/1979 | Japan . |

Primary Examiner—Larry Jones
Attorney, Agent, or Firm—Bacon & Thomas

[57] ABSTRACT

The present invention relates to a solar water heating system operating in a closed circuit and making use of a change of phase in a working fluid as a heat transfer medium, comprising: at least one collector to be exposed to sunlight for transmitting radiant solar energy to a working fluid and thus converting the fluid into a liquid-vapor mixture; a hot water storage reservoir connected to a heat exchanger; a pump for returning the working fluid to the collector; and a pipe means connecting all of the above mentioned components. The system according to the subject invention is characterized in that it comprises a separator connected to both ends of the collector; a pipe for returning the liquid coming from the liquid-vapor mixture to the lower end of the absorber of the collector in such a manner that it is constantly wet; and two pipes connecting the separator to the exchanger, one for circulating the vapor to the exchanger where it condenses and the other for allowing return of the condensed liquid to the separator, by means of the pump; the exchanger being of the type that allows free gravity flowing of the condensed liquid to the pump; and the system is further characterized in that the pump is placed below the mean level of the liquid in the exchanger and in that it ensures the return of the condensed liquid accumulated at the bottom of the exchanger to the separator.

12 Claims, 5 Drawing Figures

SOLAR HEATING SYSTEM

The present invention is directed to a solar water heating system operating in a closed circuit and making use of a change of phase in a working fluid as a heat transfer medium.

Many types of devices have been perfected in this particular field. For example, mention may be made of the solar heat energy collectors of particular forms described in Canadian Pat. No. 1,087,053. These collectors are useful in the manufacture of phase-change solar systems.

Canadian Pat. Nos. 1,107,164 and 1,116,036 refer to phase-change solar systems wherein the absorbers have such a structure that they absorb convection heat in addition to radiant heat. These absorbers are used in combination with heat pumps.

Canadian Pat. No. 1,103,539 relates to a tightly closed phase-change solar heating system comprising a phase-separator operating as a thermosiphon. This system does not require any pump but the condenser must be placed above the collectors. On the contrary, the system according to the subject invention does not operate in the manner of a thermosiphon and requires a pump. The heat exchanger is located below the collectors.

U.S. Pat. No. 4,134,390 relates to a phase-change solar heating system specifically composed of collectors including enlarged cavities. The solar heating system disclosed in this patent comprises a vacuum pump for lowering the operating temperature and pressure. A permanent control of the system pressure must be maintained. The system according to the present invention is self-regulating, does not require any vacuum pump for functioning and does not dictate any specific restraint relative to the whole network of collectors' pipings.

U.S. Pat. No. 4,211,207 refers to a phase-change heating system combining heating and cooling steps according to five thermodynamic cycles. This system makes use of specific vapour compressing and expanding means to carry out the thermodynamic cycles. The present invention, due to its simplicity, does not use such means for its operation.

U.S. Pat. No. 4,238,873 discloses a phase-change solar heating system which, due to its mode of operation, requires as a component a collector having a very specific design and installation in order to accumulate, at the bottom, a definite quantity of stored liquid. Said system needs a complicated piping means which is able to maintain the liquid at a specific level in the collector. A pressure balancing line as well as a fluid tank are further necessary. The solar heating system according to the subject invention does not require any element described in this U.S. Pat. No. 4,238,873. It has no constraint regarding the design and arrangement of the collectors, nor any particular requirement regarding the piping installation.

Finally, U.S. Pat. No. 4,240,405 relates to a solar water heater making use of phase-change heat transfer comprising a pressure accumulator and a vapour-release drum.

The above mentioned devices necessitate complicated assembly for stabilizing the liquid level in the collectors, or precise mechanisms for controlling pressure and temperature of the system, or specific design for ensuring liquid discharge either by thermosiphon or by addition of an accumulator at the level of the collectors. These particular needs complicate the installations and expose the exchanger to the ambient medium.

Unlike the above described devices, the system according to the subject invention comprises a minimum of operational elements. There is no specific need for the design and installation of solar collectors, which together with the separators are the only elements exposed to the ambient medium. Tightness of the piping is the only requirement. Pressure and internal temperature of the whole system are self-controlled without recourse to external mechanisms like a vacuum pump, compressor, relief valve etc. A liquid tank is not necessary.

The object of the present invention is to provide a solar heating device having a simple construction, operation and installation. The drawbacks encountered in the known systems have been eliminated or overcome, so as to reduce thermal losses, enhance the efficiency and durability of the system. These objects are achieved by means of phase separation, circulation and pumping mechanisms which are non-existent in the prior art systems.

Accordingly, the system of the invention essentially comprises:
   at least one collector to be exposed to sunlight for transmitting radiant solar energy to working fluid and thus converting said fluid into a liquid-vapour mixture;
   a hot water storage reservoir connected to a heat exchanger;
   a pump for returning the working fluid to the collector; and
   pipe means connecting all of the above mentioned components;
said system being characterized in that it comprises:
   a separator connected to both ends of the collector;
   a piping for returning the liquid of the liquid-vapour mixture to the lower end of the absorber of the collector in such a manner that it is constantly wet; and
   two pipes connecting the separator to the exchanger, one for circulating the vapour to the exchanger where it is condensed and the other for allowing return of the condensed liquid to the separator, by means of the pump; the exchanger being of the type that allows free gravity flowing of the condensed liquid to the pump; and in that said pump is placed below the mean level of the liquid in the exchanger and in that it ensures the return of the condensed liquid, accumulated at the bottom of the exchanger, to the separator.

The system of the invention makes use of a new phase separation mechanism which is conceived in such a manner that the heat transfer is carried out only by the gaseous phase of the working fluid and the whole surface of the collector is completely and constantly wet. The proposed flow circuit is of simple installation and minimizes thermal losses between the collectors and the exchanger. In addition, as the pump operates by heat, it may use solar heat and thus give autonomy to the whole system.

The separator according to the invention is so constructed that, by means of appropriate connection to the collector, it provides such a circulation of liquid between the upper and lower ends of the absorber that the latter is constantly wet.

Because the separator ensures liquid circulation between the inlet and the outlet of the absorber, it also allows the vapour generated in the absorber to be separated from the liquid. In this manner, the thermal exchange by means of exchangers that are external to the collector is effected only with vapour.

The existent heating systems that carry out the heat transfer by vaporization of the working fluid, do not generally make use of a separator, or if they do, their sole function is to separate the vapour from the liquid; moreover, they do not entirely soak the absorber, especially in some thermosiphons.

A further feature of the proposed system, is that, although working normally, i.e. by means of a heat exchanger located at a lower level than that of the collectors, the separator is directly coupled to the bottom of the collector to provide a constant flow of liquid between the outlet and the inlet of the collector.

The vapour flow and the return of the condensed liquid are provided by concentric or parallel pipes that connect the separator to the exchanger and to the pump of the system. All the pipes are included in an insulated sheath, thus reducing the installation to a single operation. The system being pre-assembled at the manufacturer's plant, only the connections need be made on site.

Since the condenser works as a heat exchanger and is located below the bottom of the collector, a pump must be provided to lift the liquid, condensed in the exchanger, to the level of the collector. Any conventional pumping mechanisms may be used. Operating in a closed circuit, and having to pump liquids with certain demanding chemical properties, these pumps must meet with severe constraints of tightness, compatibility, maintenance and durability. To avoid certain drawbacks and to eliminate the above mentioned constraints, the present invention further proposes to use a vapour pressure pump.

Such a pump ensures the return of the condensed liquid to the separator by the action of a vapour pressure created from a portion of said liquid sampled only when predetermined level of liquid into the pump is reached, by means of a continuous external heat source capable of vaporizing the liquid thus sampled. Said portion of liquid used to create the vapour is sampled via a liquid sampling mechanism to be vaporized by means of a flash vapour generating mechanism whose instantaneous action has the effect of reducing the power required for pumping the liquid relative to slow boiling mechanism normally used.

The operating principle of said pump may be summarized as follows. A small quantity of the liquid contained in an inner reservoir is vaporized inside a closed reservoir. This quantity of liquid is drawn when a predetermined level of the liquid is reached in the inner reservoir and it is brought to boiling by contacting a hot surface inside the pump. The vapour thus produced generates a pressure that acts directly on the liquid surface and drives it up to the collector. The pump does not need any piston; it does not operate by the displacement of membranes and no external reservoir of vapour under pressure is necessary.

The pump is constituted by two concentric reservoirs separated from each other so as to define a small volume between their walls. The tightly closed external reservoir is made of a heat conducting material capable of being constantly heated by means of an external heat source capable of evaporating the fluid discharged between the walls. This source may be a heating coil or an electric hot-plate. It may be controlled by thermostat. The external reservoir is connected to a gravity feed pipe by means of an inlet unidirectional valve and to a liquid outlet pipe by an outlet unidirectional valve, this external reservoir being also provided with a vapour exhaust valve necessary for balancing the pressure between the exchanger and the pump when it is being filled up.

The internal reservoir is made of an insulating material. Said reservoir encloses a mechanism for sampling the liquid to be vaporized. The bottom of the internal reservoir has an aperture by which the liquid may escape so as to fill the volume between the walls of the two concentric reservoirs. The internal reservoir further comprises an insulating float for thermally insulating the liquid surface in contact with the space existing above the reservoir.

The vapour exhaust valve and the aperture for discharging the liquid to be vaporized function in opposition to each other by means of two obturators mechanically bound together and which are actuated together by the action of the float enclosed in the internal reservoir.

The obturators are preferably secured to the ends of a rigid stem. Said obturators may, for example, be a needle or a seat.

The weight of the stem with the obturators is such that the stem can be held in an upward position by the pressure caused during the liquid discharging phase and that it can close the aperture at the bottom of the internal reservoir when the pump is being filled.

Moreover, the length of the stem is such that when the lower obturator closes the aperture for discharging the liquid, the upper obturator releases the opening of the vapour valve.

The mechanism for actuating the inlet and outlet valves as well as the mechanism for opening the aperture for discharging the liquid and the vapour exhaust valve are subjected to the internal pressure of the pump without interference by external electric or mechanical control elements.

The elements making part of the pump are fixed, except the valves and the float.

The heat source fixed onto the external wall of the external reservoir is actuated by a commutator controlled either by a solar intensity detector or a temperature differential sensor between the absorber and heat exchanger (not shown).

In order to better understand the invention without limiting the same, reference is made to the accompanying drawings, in which.

Figure 1:
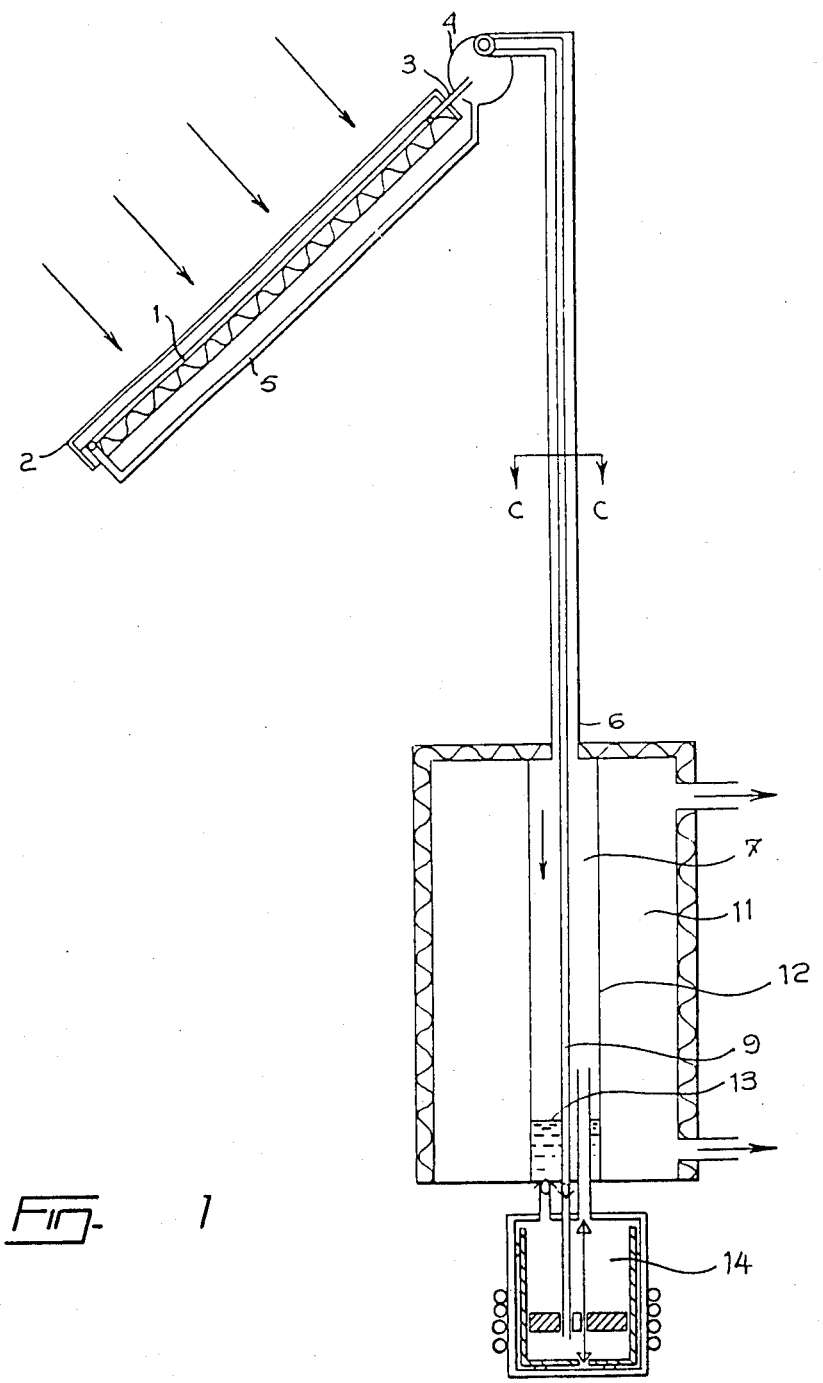
FIG. 1 is a diagrammatic elevation view of a preferred embodiment of the solar heating system according to the present invention.

Under the effect of solar radiation, as shown in FIG. 1, the absorber 1 of the collector 2 brings the liquid contained therein to be vaporized. Due to the local pressure build up a mixture of vapour and liquid escapes from pipe 3 into separator 4. The vapour circulates in the free part of the separator 4 whereas the liquid falls by its own weight to the bottom of the separator 4 and is then returned to the bottom of the absorber 1 of the collector 2 throughout the pipe 5. The vapour escapes from the outlet pipe 6 and condenses in a heat exchanger 7 located at the end of the pipe 6, the exchanger 7 being of the type that allows free gravity flowing of the condensed liquid to the pump. The separator 4 is a reservoir of which the capacity of liquid retention under the level 8, fixed by the height of the end of pipe 6 at the separator 4, is equal to at least the volume of the liquid pumped during one cycle.

Figure 3:
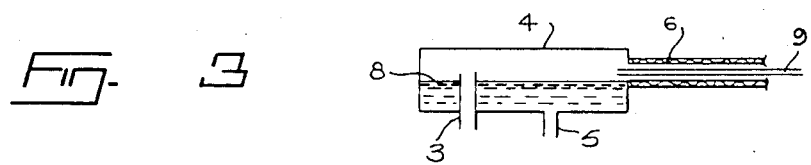
FIG. 3 is an enlarged view of the separator shown in FIG. 1.
Figure 4:
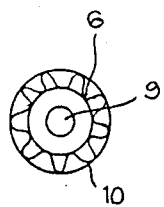
FIG. 4 is a cross-sectional view of the pipe connecting the separator to the exchanger and to the pump of said system, along line C—C in FIG. 1.
Figure 5:
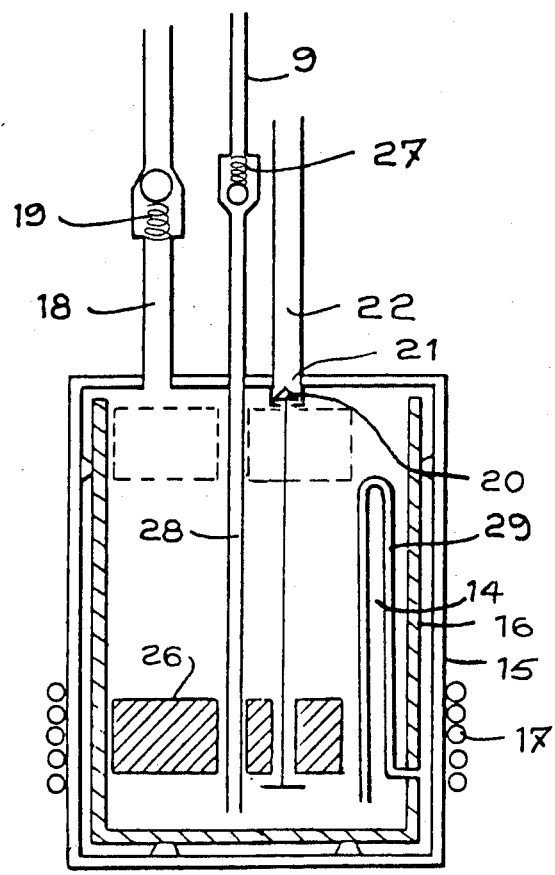
FIG. 5 is a variant of the pump shown in FIG. 2.

According to FIGS. 1 and 3, return of the condensed liquid to the separator 4 is by means of a pipe 9 concentric to outlet pipe 6 leading vapour to the exchanger 7. Said concentric pipes are enclosed in an insulating sheath 10, as illustrated in FIG. 4.

The heat exchanger 7 is a fuel fed single or double walled concentric chimney of the type used in insulated water-heaters. The vapour condensation is produced on the internal wall 12 of the exchanger 7, the vapour transferring its condensation heat by conduction through the exchanger wall and then by convection to the water in the reservoir 11. The condensed liquid accumulates at the bottom of the exchanger 7.

Figure 2:
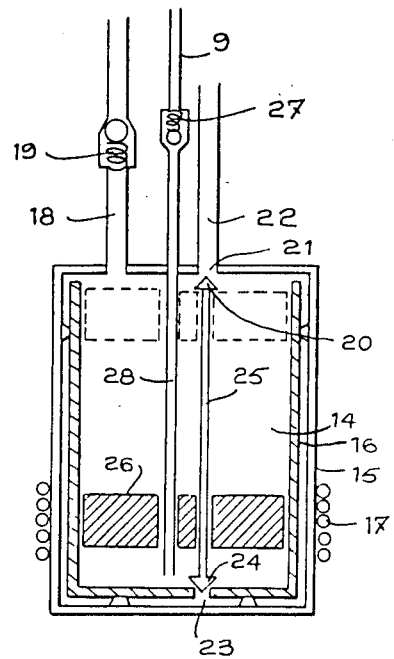
FIG. 2 is an enlarged cross-sectional view of the pump shown in FIG. 1.

With reference to FIG. 2, the pump 14 comprises two concentric reservoirs 15-16 separated from each other, so as to create a small available space between their walls. The external reservoir 15 is made of a heat conducting material allowing the heating element 17 to continuously heat it. The external reservoir 15 is connected to the exchanger 7 through the liquid inlet 18 via the one-way valve 19 and through a vapour valve comprising a movable needle 20, an aperture 21 and an outlet pipe 22.

The internal reservoir 16 is made of heat insulating material. The bottom of said reservoir has an aperture 23 through which escapes the liquid which is to fill up the space between the walls of the two concentric reservoirs 15-16. When contacting the inner wall of the external reservoir 15 which is continuously heated, said liquid immediately vaporizes. The sudden rise in pressure thus created in the pump causes the closing of valve 19 and the opening of valve 27. As a result, the liquid accumulated in the internal reservoir 16 is expelled therefrom to the separator 4 via the pipe 28 connected to the pipe 9. When the reservoir 16 is empty, said aperture 23 is closed by means of a needle 24 held under its own weight and that of the stem 25 by which it is connected to the upper needle 20.

The pump operates as follows:

When the reservoir 16 is empty and the pressures between the heat absorbing system and the pump are in equilibrium, the liquid 13 to be pumped enters by gravity in the reservoir 16 through pipe 18, the valve 19 being opened under the weight of the liquid 13. The stem 25 presses the needle 24 onto the aperture 23 to prevent any leakage of the accumulated liquid between the walls. The needle 20 releases the aperture 21 of the vapour valve. The outlet of the vapour pipe 22 stands above the liquid level 13 in the exchanger 7. The float 26 gradually rises as the filling of the reservoir proceeds. When it reaches the base of the needle 20, it lifts it up to close the aperture 21, causing immediate opening of the aperture 23 to allow discharging liquid between the walls. Since the wall of the reservoir 15 is continuously heated by means of the heating element 17, this liquid immediately vaporizes, thus creating a sudden rise in pressure in the pump. As a result, the valve 19 closes and the valve 27 opens thus driving the liquid accumulated in the reservoir 16 back into the separator 4 via the pipe 28 connected to the pipe 9. When the reservoir 16 is empty, the float 26 presses against the needle 24 to close aperture 23 therefore forcing the needle 20, held against its seat by the internal pressure of the reservoir 15, to free the aperture 21. As the pressures are being balanced between the exchanger 7 and the pump 14, the valve 19 opens and enables the liquid to fill up the pump again. The cycle therefore repeats itself.

While one embodiment of the invention has been described, it will be understood that it is capable of still further modifications and this application is intended to cover any variations, uses, or adaptations of the invention, following in general the principles of the invention and including such departures from the present disclosure as to come within the knowledge or customary practice in the art to which the invention pertains, and as may be applied to the essential features hereinbefore set forth and falling within the scope of the invention or the limits of the appended claims.

Thus, for example, the pipes connecting the separator 4 to the exchanger 7 and to the pump 14 of the system can be parallel instead of being concentric.

In addition, the discharge of liquid to be vaporized between the walls of the internal and external reservoirs 15-16 of the pump 14 can also be actuated by a siphon 29 started by means of a determined liquid level in the internal reservoir 16.

Said siphon 29 has the same function as the aperture 23 of the bottom of the internal reservoir 16, i.e. it allows the sampling of the liquid to be vapourized and it ensures the draining of said liquid as long as the internal reservoir 16 is not empty. In a similar manner to the principle of communicating vases, once being started, the discharge tends to equalize the level of the liquid in the internal reservoir 16 and the level of the small reservoir formed by the space between the two reservoirs 15-16.

The float 26 keeps its function of thermal insulator of the liquid surface in contact with the space above the interval reservoir 16 as well as its function of actuating mechanism of the obturator 20 for the vapour exhaust valve 21. Said valve 21 operates contrarily to the siphon 29. The lower obturator 24 is no more necessary.

What is claimed is:

1. A solar water heating system operating in a closed circuit and making use of a change of phase of a working fluid as a heat transfer medium, comprising:

at least one collector to be exposed to sunlight for transmitting radiant solar energy to the working fluid in order to convert said fluid into a liquid-vapour mixture, said collecotr having an inlet and an outlet through which the liquid-vapour mixture exits;

a heat exchanger having an inlet and an outlet, said heat exchanger being of the type that allows free gravity flowing of the liquid that condenses therein;

a hot water storage reservoir connected to the heat exchanger to recover and store the heat extracted from the working fluid in said heat exchanger;

first piping means connecting the outlet of said at least one collector to the inlet of said heat exchanger, said first piping means including a phase-separator mounted thereon adjacent the outlet of said at least one collector to extract the liquid phase from the vapour phase in the liquid-vapour mixture exiting said collector;

second piping means for returning the liquid phase extracted in said phase separator to the inlet of said at least one collector whereby said collector is constantly wet and the heat exchanger is supplied with the working fluid in vapour phase only through said first piping means;

third piping means for connecting the outlet of the heat exchanger to the inlet of said at least one collector through the phase separator and said second piping means; and pumping means for returning the working fluid from the heat exchanger to said at least one collecotr through said third piping means, said pumping means being placed below the mean level of the liquid condensing in said heat exchanger to exclusively return the condensed liquid accumulated at the outlet of said heat exchanger to said phase separator through said third piping means wherein said pump comprises two concentric reservoirs spaced from each other so as to define a small volume therebetween, the internal reservoir being made of insulating material and the external reservoir being made of heat conducting material; said external reservoir being closed but connected to the outlet of said heat exchanger by means of a gravity feed pipe provided with an inlet unidirectional valve and also to the third piping means via an outlet unidirectional valve, said external reservoir being further provided with a vapour exhaust valve adapted to equilibrate the pressures between the gravity feed pipe and the pump during filling thereof; internal reservoir further enclosing a mechanism for sampling the liquid to be vaporized.

2. A system as claimed in claim 1 wherein said third piping means for returning the liquid to the separator is concentric to said first piping means used for conveying the vapour to the exchanger, both of said piping means being enclosed in an insulating sheath.

3. A system as claimed in claim 1, wherein said internal reservoir has an aperture in its bottom for sampling the liquid to be vaporized and a float made of insulating material for thermally insulating the liquid surface in contact with the space above said internal reservoir; said vapour exhaust valve and said aperture for discharging the liquid to be vaporized being opened and closed in a reverse manner by means of two obturators mechanically interconnected said obturators being actuated together by the action of the float housed in the internal reservoir.

4. A system as claimed in claim 3, wherein said obturators are provided at the ends of a rigid stem passing through the float, said stem and the lower obturator attached thereto closing by gravity the aperture at the bottom of the internal reservoir during filling of the pump, said stem having such a length that the upper obturator does not close the aperture of the vapour exhaust valve when the lower obturator closes the aperture for sampling the liquid.

5. A system as claimed in claim 4 wherein said obturators are needles cooperating with corresponding seats.

6. A system as claimed in claim 1, wherein said internal reservoir contains a siphon which is actuated only when the liquid in the internal reservoir has reached a predetermined level, said liquid flowing into the volume between the two reservoirs until said internal reservoir is empty; said internal reservoir further containing a float made of insulating material for thermally insulating the liquid surface in contact with the space above said internal reservoir; said vapour exhaust valve being closed by means of an obturator when the siphon is operating said obturator being actuated by the action of the float housed in the internal reservoir.

7. A system as claimed in claim 6, wherein said obturator is provided at the upper end of a rigid stem.

8. A solar water heating system operating in a closed circuit and making use of a change of phase of a working fluid as a heat transfer medium, comprising:

at least one collector to be exoosed to sublight for transmitting radiant solar energy to the working fluid in order to convert said fluid into a liquid-vapour mixture, said collector having an inlet and an outlet through which the liquid-vapour mixture exits;

a heat exchanger having an inlet and an outlet, said heat exchanger being of the type that allows free gravity flowing of the liquid that condenses therein;

a hot water storage reservoir connected to the heat exchanger to recover and store the heat extracted from the working fluid in said heat exchanger;

first piping means connecting the outlet of said at least one collector to the inlet of said heat exchanger, said first piping means including a phase-separator mounted thereon adjacent the outlet of said at least one collector to extract the liquid phase from the vapour phase in the liquid-vapour mixture exiting said collector;

second piping means for returning the liquid phase extracted in said phase separator to the inlet of said at least one collector whereby said collector is constantly wet and the heat exchanger is supplied with the working fluid in vapour phase only through said first piping means;

third piping means for connecting the outlet of the heat exchanger to the inlet of said at least one collector through the phase separator and said second piping means; and pumping means for returning the working fluid from the heat exchanger to said at least one collector through said third piping means, said pumping means being placed below the mean level of the liquid condensing in said heat exchanger to exclusively return the condensed liquid accumulated at the outlet of said heat exchanger to said phase separator through said third piping means wherein said pump for returning the liquid accumulated at the outlet of the exchanger to the separator is a vapour pressure pump wherein vapour pressure is generated from a portion of the condensed liquid sampled only when a predetermined level of liquid into the pump is reached by means of a continuous external heat source when a predetermined level of liquid is reached in the pump.

9. A system as claimed in claim 8, wherein the external heat source is controlled by means of a thermostat.

10. System as claimed in claim 9, wherein said heat source is controlled by means of a thermostat.

11. A system as claimed in claim 9, wherein said external heat source is controlled by a sunlight intensity detector.

12. A system as claimed in claim 9, wherein said external heat source is controlled by a temperature differential sensor mounted between said at least one collector and said heat exchanger.

* * * * *